F. E. CASE.
BATTERY CHARGING APPARATUS.
APPLICATION FILED NOV. 25, 1908.
920,103.
Patented Apr. 27, 1909.
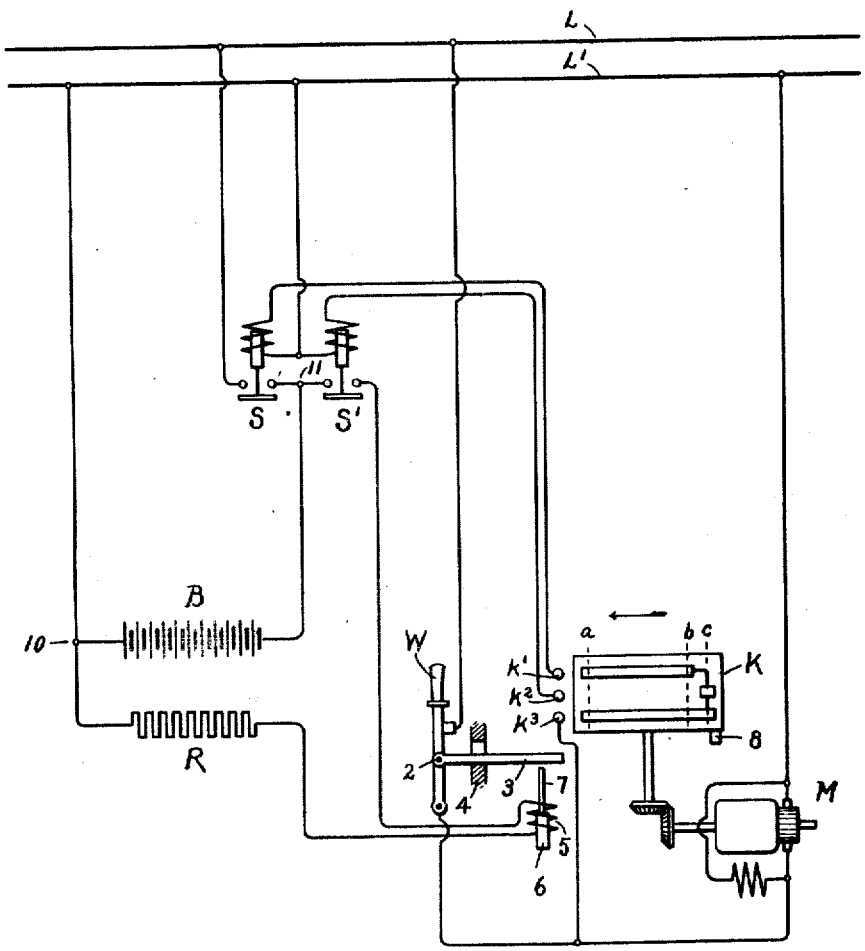
Witnesses
J. Earl Ryan.
Ellis Elen.
Inventor.
Frank E. Case.
by Albert H. Davis
Atty.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

BATTERY-CHARGING APPARATUS.

No. 920,103.      Specification of Letters Patent.      Patented April 27, 1909.

Application filed November 25, 1908. Serial No. 464,375.

*To all whom it may concern:*

Be it known that I, FRANK E. CASE, a citizen of the United States, residing at Schenectady, county of Schenectady, State of New York, have invented certain new and useful Improvements in Battery-Charging Apparatus, of which the following is a specification.

My invention relates to apparatus for use in connection with the charging of electric storage batteries. It is especially adapted for use in connection with the charging of storage batteries for automobiles, in which service it is highly desirable that means be provided for properly charging the batteries, irrespective of the knowledge or care of the person having supervision of the work.

With my invention it is only necessary that the operator connect the terminals of the battery to proper terminals connected with the source and then close a single switch. When this is done charging will commence and will continue until the battery is fully charged, whereupon the connection with the source will be automatically interrupted and further charging prevented.

It is well known that the open circuit potential across the terminals of a storage battery does not give a correct indication of the charged condition of said battery. It is a fact that the potential across the battery at "no load" may be as high when the battery is only partly charged as when it is in its full charged condition. The true condition of the battery is indicated when it is called upon to furnish its normal amount of current. Under this condition it is found that if the battery is "low" the voltage will at once fall considerably below "no load" value, while if the battery is in its full charged condition the potential at "no load" and "full load" will be more nearly the same. From this it follows that those forms of battery charging apparatus which automatically interrupt the connection with the source of current supply when the "no load" voltage across the battery has reached a certain value are unsatisfactory, and it is an object of my invention to provide means for automatically disconnecting the battery from the source when the battery has been charged to that condition under which at normal load it furnishes the desired potential. To this end in carrying out my invention I provide automatically operated means which, when thrown into operation, alternately connects the battery to and disconnects it from a source of current supply, combined with means, responsive to the current furnished by said battery when fully charged and short-circuited through a certain resistance, for controlling the operation of said automatically operated means.

More specifically stated, my invention comprises a switch for connecting the battery to the source of current supply and automatically operating means for alternately closing and opening said switch, combined with certain means, responsive to the current which the battery furnishes in its full charged condition when short-circuited through a certain resistance, for interrupting the operation of said automatically operating means.

My invention will be more fully understood from the following description, taken in connection with the accompanying drawing, in which I have shown diagrammatically one embodiment thereof.

In the drawing, B indicates a storage battery to be charged and L L¹ a source of current supply. An electrically controlled switch S when closed connects the battery to the source, and an electrically controlled switch S¹ when closed short circuits the battery through a resistance R and the coil of an electromagnet hereinafter referred to. The resistance R is of such a value that when the battery is in its full charged condition the current obtained when the switch S¹ is closed will be equal to or slightly greater than the normal discharge current. At M is indicated a small shunt wound motor which can be connected to the source by a control switch W. The motor M through suitable gearing drives a drum K carrying segments electrically connected together which coöperate with stationary fingers $k^1$, $k^2$ and $k^3$ which are connected, respectively, to the actuating coil of the switch S, actuating coil of the switch S¹, and the line L through the switch W. The drum K and the fingers $k^1$, $k^2$ and $k^3$ may be of any suitable construction, and are shown in a well known conventional manner, the arrangement of the segments being clearly indicated in the drawing.

Pivotally attached to the movable arm of the switch W at 2, is a lever 3 which is supported in a horizontal position, as shown, by a member 4, through a hole in which it passes. The electromagnet, above referred to, located in the circuit through the resistance R controlled by the switch $S^1$, is shown as comprising a coil 5, within which a movable core 6 is arranged for movement against the force of gravity. The core 6 has an upward extension 7 which is arranged when the core is pulled up by the energization of the coil 5, to engage with the lever 3 and raise the free end thereof. A lug 8 carried by the drum K is arranged to engage with the end of the lever 3 when the latter is in its raised position, but when the lever is in the position shown will pass over it without engaging its end. The coil 5 is so designed that only when it receives the current which the storage battery gives when it is in its full charged condition will the core 6 be raised.

The operation of the apparatus shown is as follows: The storage battery B being connected to suitable terminals, corresponding to the points 10 and 11, the switch W may be closed and the motor M will commence rotating. As the drum K is rotated by the motor M in the direction of the arrow the fingers $k^1$ and $k^2$ engage on line $a$ with coöperating segments and the actuating coil of the switch S is energized, thereby causing this switch to close which connects the battery B to the source L $L^1$. The switch S will remain closed as long as the finger $k^1$ engages with its coöperating segment, or until the finger engages with the segments on the line $b$, but when this finger $k^1$ ceases to so engage, the switch S will open and the connection of the battery with the source will be interrupted. The drum K continues rotating and immediately after opening of the switch S the finger $k^2$ engages with its coöperating segment on the line $c$ and the actuating coil of the switch $S^1$ is energized, thereby closing this switch. Closing of the switch $S^1$ connects the coil 5 to the terminals of the storage battery B through the resistance R and, if the battery has been brought to its full charged condition, the current through the coil 5 will be sufficient to cause the core 6 to pull up, thereby causing its extension 7 to engage the lever 3 and raise the end of the same into the path of the lug 8 on the drum K. As the drum continues to rotate, the lug 8 will force the switch W open and the motor and the control circuits will be deënergized. If, however, the battery has not been charged sufficiently to give the current, through the resistance R and the coil 5, necessary for causing the core 6 to rise, the lug 8 will move over the end of the lever 3 and the motor M will continue to drive the drum K, thereby disengaging the finger $k^2$ and its corresponding segment and bringing the finger $k^1$ and its segment into engagement. Under this condition the switch $S^1$ will open and the switch S will close, thereby again connecting the battery to the source, a condition which will be maintained until the drum K has made another revolution. From the above it will be clear that the battery M will be alternately connected to the source and short-circuited through the resistance R and the coil 5 until the potential of the battery at normal load has been raised by charging to the value corresponding to the full charged condition of the battery, at which time the switch W will be opened and further charging of the battery will be prevented. It is, therefore, merely necessary for the operator to close the switch W, after which the device operates automatically.

While I have shown but one form in which my invention may be embodied, I do not wish to be understood as limiting myself thereto, since in the following claims I aim to cover all modifications which come within the scope of my invention. For example, the electromagnet having the coil 5 might equally well be made responsive to the current supplied by the battery to the circuit through the resistance R, by being connected in shunt to said resistance instead of in series with it.

What I claim as new and desire to secure by Letters Patent of the United States, is,—

1. In combination a storage battery, a source of current supply, automatically operating means for alternately connecting said battery to and disconnecting it from said source, and means operative when said battery is disconnected from said source and responsive to a certain current from said battery for interrupting the operation of said automatically operating means.

2. In combination a storage battery, a source of current supply, automatically operating means for alternately connecting said battery to and disconnecting it from said source, and means operative when said battery is disconnected from said source and responsive to a certain current from said battery for rendering said automatically operating means inoperative and permanently interrupting the connection of said battery with said source.

3. In combination a storage battery, a source of current supply, a switch for connecting said battery to said source, automatically operating means for alternately closing and opening said switch, and means operative when said switch is open and responsive to a certain current from said battery for interrupting the operation of said automatically operating means.

4. In combination a storage battery, a source of current supply, a switch for connecting said battery to said source, automatically operating means for alternately closing and opening said switch, and means operative when said switch is open and responsive to a certain current from said battery for rendering said automatically operating means inoperative and maintaining said switch open.

5. In combination a storage battery, a source of current supply, a switch for connecting said battery to said source, a switch operating means for closing said switch and automatically and periodically opening the same temporarily, means responsive to a certain current from said battery for rendering said switch operating means inoperative, and means for rendering said current responsive means operative only when said switch is open.

6. In combination a storage battery, a source of current supply, a switch for connecting said battery to said source, an electrically operated device for alternately closing and opening said switch, a switch for throwing said device into and out of operation, and means responsive to current from said battery for rendering said device inoperative when said current exceeds a certain value.

7. In combination a storage battery, a source of current supply, a switch for connecting said battery to said source, an electrically operated device for alternately closing and opening said switch, a switch for throwing said device into and out of operation, and means responsive to current from said battery for opening said last mentioned switch when said current exceeds a certain value.

8. In combination a storage battery, a source of current supply, a switch for connecting said battery to said source, an electrically operated device for alternately closing and opening said switch, means responsive to current from said battery for rendering said device inoperative when said current exceeds a certain value, and means controlled by said device for rendering said current responsive means operative only when said switch is open.

9. In combination a storage battery, a source of current supply, a switch for connecting said battery to said source, an electrically operated device for alternately closing and opening said switch, a control switch for throwing said device into and out of operation, means responsive to a certain current from said battery for causing the opening of said control switch, and means controlled by said device for rendering said current responsive device operative only when the first mentioned switch is open.

10. In combination a storage battery, a source of current supply, a resistance, switch devices for connecting said battery to said source and for short circuiting it through said resistance, automatically operating means for controlling the operation of said switch devices, and means responsive to a certain current through said resistance for interrupting the operation of said automatically operating means.

11. In combination a storage battery, a source of current supply, a resistance, switch devices for connecting said battery to said source and for short circuiting said battery through said resistance, automatically operating means for regulating the operation of said switch devices to effect connection of said battery with said source and short circuiting of said battery through said resistance alternately, and means responsive to a certain current through said resistance for interrupting operation of said automatically operating means.

12. In combination a storage battery, a source of current supply, a resistance, a switch for connecting said battery to said source, another switch device for short circuiting said battery through said resistance, automatically operating means for alternately closing said switch devices, and means responsive to a certain current through said resistance for interrupting the operation of said automatically operating means.

13. In combination a storage battery, a source of current supply, a resistance, a switch device for connecting said battery to said source, a switch for short circuiting said battery through said resistance, electrically operated switch operating means for automatically closing said switches alternately, an electromagnet having its coil located in the circuit through said resistance and responsive to current approximately equal to the normal discharge current of said battery when the same is fully charged, and means operated by said electromagnet for interrupting the operation of said switch operating means.

In witness whereof, I have hereunto set my hand this 23rd day of November, 1908.

FRANK E. CASE.

Witnesses:
BENJAMIN B. HULL,
HELEN ORFORD.